United States Patent
Brafman et al.

(10) Patent No.: US 9,006,501 B2
(45) Date of Patent: Apr. 14, 2015

(54) LOW POUR POINT RENEWABLE FUEL BLEND

(75) Inventors: Rebecca Brafman, Concord, CA (US);
Stephen Roby, Hercules, CA (US);
Guangci Zhou, El Cerrito, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 647 days.

(21) Appl. No.: 13/100,832

(22) Filed: May 4, 2011

(65) Prior Publication Data

US 2012/0283491 A1 Nov. 8, 2012

(51) Int. Cl.
*C10L 1/04* (2006.01)
*C07C 1/00* (2006.01)
*C10G 45/00* (2006.01)
*C10G 3/00* (2006.01)

(52) U.S. Cl.
CPC . *C10L 1/04* (2013.01); *C10G 45/00* (2013.01); *C10G 3/50* (2013.01); *C10G 2300/1011* (2013.01); *C10G 2300/304* (2013.01); *C10G 2300/1048* (2013.01); *C10G 2300/301* (2013.01)

(58) Field of Classification Search
CPC .............. C10G 2300/1011; C10G 2300/1048; C10G 2300/301; C10G 2300/304; C10G 3/50; C10G 45/00; C10L 1/04; C07C 1/00
USPC .................................................... 585/14, 733
See application file for complete search history.

(56) References Cited

U.S. PATENT DOCUMENTS

| | | | |
|---|---|---|---|
| 7,598,426 B2 | 10/2009 | Fang et al. | |
| 2007/0282000 A1 | 12/2007 | Murphy | |
| 2008/0308458 A1* | 12/2008 | Dindi et al. | 208/137 |
| 2009/0047721 A1 | 2/2009 | Trimbur et al. | |
| 2009/0166256 A1 | 7/2009 | Lewis et al. | |
| 2010/0019108 A1 | 1/2010 | Li et al. | |
| 2010/0038284 A1 | 2/2010 | Vergel | |
| 2010/0151112 A1 | 6/2010 | Franklin et al. | |
| 2010/0154291 A1 | 6/2010 | Roby et al. | |
| 2010/0155296 A1* | 6/2010 | Aves et al. | 208/89 |
| 2010/0296997 A1 | 11/2010 | Parker et al. | |
| 2011/0047862 A1 | 3/2011 | Mayeur et al. | |
| 2014/0081057 A1* | 3/2014 | Abhari et al. | 585/16 |
| 2014/0109470 A1* | 4/2014 | Ramirez Corredores et al. | 44/639 |

FOREIGN PATENT DOCUMENTS

EP 1484385 12/2004

OTHER PUBLICATIONS

Beauchet et al., Hydroliquefaction of green wastes to produce fuels, Bioresource Technology (2011).
PCT International Search Report regarding PCT/US2012/031531 dated Oct. 29, 2012 (4 pages).

* cited by examiner

*Primary Examiner* — Prem C Singh
*Assistant Examiner* — Chantel Graham
(74) *Attorney, Agent, or Firm* — Alan W. Klaassen

(57) ABSTRACT

A renewable fuel blend and a process for producing a renewable fuel blend are described. The blend includes biologically derived $C_{13}$ to $C_{18}$ normal paraffins, which are provided to the blend in quantities such that blend does not require a pour point reducing treatment to achieve a low pour point. In embodiments, the normal paraffins are produced in an upgrading process, such as a hydrotreating process.

7 Claims, 3 Drawing Sheets

Pour Point of Renewable Fuel Blend

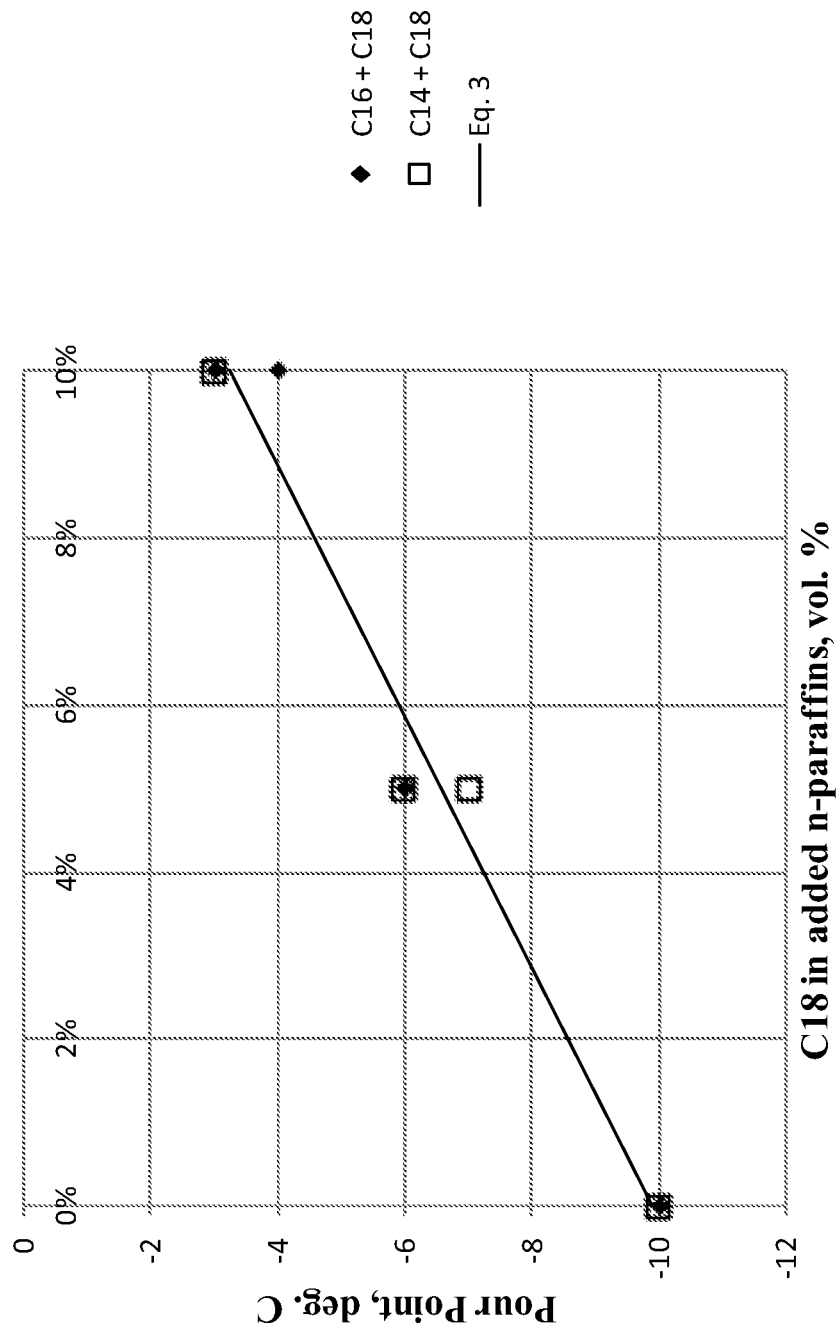

LOW POUR POINT RENEWABLE FUEL BLEND

FIELD OF THE INVENTION

This invention relates generally to fuels derived from biomass, and specifically to methods and systems for efficiently making a renewable transportation fuel.

BACKGROUND OF THE INVENTION

Biofuels are of increasing interest for a number of reasons including: (1) they are a renewable resource, (2) their production is less dependent on geopolitical considerations, (3) they provide the possibility of a direct replacement of petroleum-based fuels in existing vehicles, and (4) the net greenhouse gas emissions can be substantially reduced by virtue of CO2 uptake by biofuel precursors—particularly in the case of cellulosic feedstocks.

An easily-obtainable biofuel is vegetable oil, which largely comprises glycerides and some free fatty acids. The properties of vegetable oil, however, make it generally inappropriate for use as a direct replacement for petroleum diesel in vehicle engines. The vegetable oils' viscosities are generally too high and they do not burn cleanly enough, thereby leaving damaging carbon deposits on the engine. Additionally, vegetable oils tend to gel, especially at low temperatures, thereby hindering their use in colder climates. These problems are mitigated when the vegetable oils are blended with petroleum fuels, but still remain an impediment for long-term use in diesel engines.

Hydroisomerization is often used to improve the low temperature properties of vegetable oils blended with petroleum fuels. But requiring a hydroisomerization process step for making blends that meet specifications adds significant cost. It is desirable to develop a process for making renewable transportation fuels that contain vegetable oils without the need for a hydroisomerization process step.

The foregoing has outlined rather broadly features of the present invention in order that the detailed description of the invention that follows may be better understood. Additional features and advantages of the invention will be described hereinafter which form the subject of the claims of the invention.

SUMMARY OF THE INVENTION

Accordingly, the present invention provides a renewable fuel composition having a low pour point, such as a pour point of less than 0° C., and a method for preparing the renewable fuel composition.

In embodiments, the process for producing a renewable fuel blend comprises providing in a range of from 1 vol. % to 20 vol. % of biologically derived $C_{13}$ to $C_{18}$ normal paraffins to a renewable fuel blend, such that a ratio $\Delta C_{18}/(\Delta C_{14}+\Delta C_{16})$ is less than 0.5, wherein:
  $\Delta C_{18}$ represents a quantity of biologically derived $C_{18}$ normal paraffins, as a vol. % of the renewable fuel blend;
  $\Delta C_{16}$ represents a quantity of biologically derived $C_{16}$ normal paraffins, as a vol. % of the renewable fuel blend; and
  $\Delta C_{14}$ represents a quantity of biologically derived $C_{14}$ normal paraffins, as a vol. % of the renewable fuel blend.
In embodiments, $\Delta C_{14}$ is in the range of from 0 to 10 vol. %, $\Delta C_{16}$ is in the range of from 0 to 10 vol. %, and $\Delta C_{18}$ is in the range of from 0 to 5 vol. %.

In embodiments, biologically derived normal paraffins are blending with middle distillate to produce the renewable fuel blend. In embodiments, a biologically derived feedstock is hydrotreated to form the biologically derived normal paraffins. In embodiments, a biologically derived feedstock is pretreated, and at least a portion of the pretreated products are hydrotreated to form the normal paraffins.

In embodiments, the renewable fuel blend is produced by hydrotreating a middle distillate and blending at least a portion of the hydrotreated product with biologically derived normal paraffins. In embodiments, the renewable fuel blend is produced by hydrotreating a blend of biologically derived normal paraffins and middle distillate. In embodiments, the biologically derived feedstock is pretreated, and at least a portion of the pretreated products are blended with middle distillate and the blend hydrotreated to produce the renewable fuel blend.

The present invention further provides a process for producing a renewable fuel blend comprising pretreating at least one biologically derived oil to produce a biologically derived feedstock; hydrotreating a blend of the biologically derived feedstock and a middle distillate to produce at least one hydrotreated liquid effluent; and recovering a renewable fuel blend comprising in the range of from 1 vol. % to 20 vol. % of biologically derived C13 to C18 normal paraffins, such that the ratio $\Delta C_{18}/(\Delta C_{14}+\Delta C_{16})$ is less than 0.5, wherein:
  $\Delta C_{18}$ represents a quantity of biologically derived $C_{18}$ normal paraffins provided by the biologically derived feedstock, as a vol. % of the renewable fuel blend;
  $\Delta C_{16}$ represents a quantity of biologically derived $C_{16}$ normal paraffins provided by the biologically derived feedstock, as a vol. % of the renewable fuel blend; and
  $\Delta C_{14}$ represents a quantity of biologically derived $C_{14}$ normal paraffins provided by the biologically derived feedstock, as a vol. % of the renewable fuel blend.

The present invention further provides a renewable fuel blend comprising in the range of from 1 vol. % to 20 vol. % of biologically derived $C_{13}$ to $C_{18}$ normal paraffins, such that the ratio $\Delta C_{18}/(\Delta C_{14}+\Delta C_{16})$ is less than 0.5, wherein:
  $\Delta C_{18}$ represents a quantity of biologically derived $C_{18}$ normal paraffins, as a vol. % of the renewable fuel blend;
  $\Delta C_{16}$ represents a quantity of biologically derived $C_{16}$ normal paraffins, as a vol. % of the renewable fuel blend; and
  $\Delta C_{14}$ represents a quantity of biologically derived $C_{14}$ normal paraffins, as a vol. % of the renewable fuel blend.

BRIEF DESCRIPTION OF THE DRAWINGS

FIG. 2 and FIG. 3 are graphical representations of the changes in the pour points of renewable fuel blends containing varying quantities of normal paraffins.

DETAILED DESCRIPTION OF THE INVENTION

Figure 1:
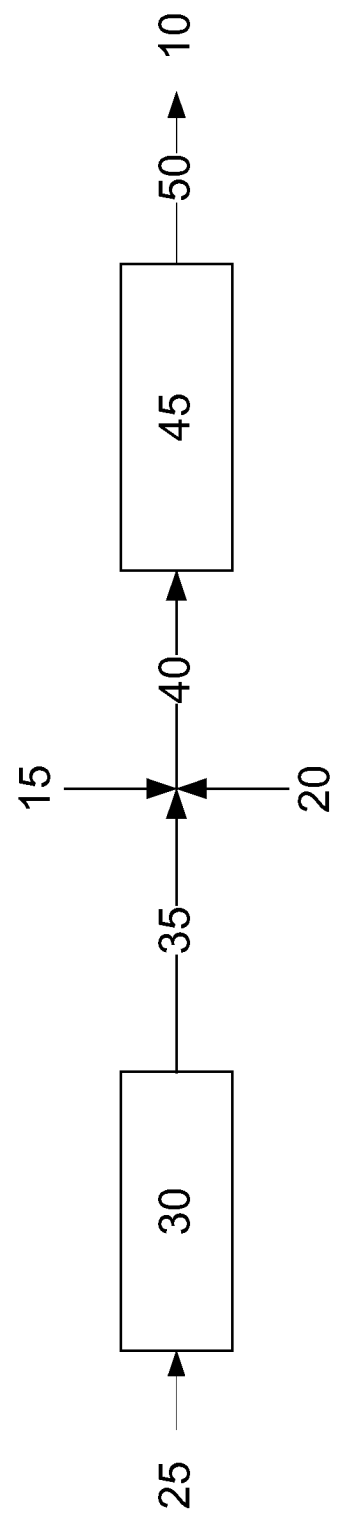
FIG. 1 illustrates an embodiment of the invention.

The present invention relates to a renewable fuel composition comprising biologically derived normal paraffins, and to a process for making the renewable fuel composition. As used herein, "renewable fuel" is produced, at least in part, from biologically derived feedstocks, i.e. feedstocks that are derived from a renewable biological resource, organism, or entity. A biologically derived feedstock is intended to include feedstocks other than those derived from petroleum crude oil, and may originate from a single biological source or from multiple biological sources.

Introducing biologically derived materials into a refinery stream for producing transportation fuel is useful for reducing the carbon footprint of a petroleum refining operation. The biologically derived materials are converted along with petroleum fractions into fuel blends that have the desired properties for fuels. For example, fats and free fatty acids may be converted during a refinery process into normal paraffins, having a carbon number in the $C_8$ to $C_{24}$ range, with a high proportion of the normal paraffins being in the $C_{16}$ and $C_{18}$ carbon number range. These paraffins have good fuel properties, but they tend to produce fuel blends with high pour points. Typically, fuels made with biologically derived materials undergo a pour point reducing treatment, by, e.g. hydroisomerization or addition of a pour point reducing additive to reduce the pour point to acceptable levels. In embodiments, the present invention provides a renewable fuel blend and a process for preparing a renewable fuel blend that does not require a pour point reducing treatment to achieve acceptably low pour points.

Reference is made throughout this specification to hydrocarbons characterized by a particular carbon number or carbon number range. As used herein, "carbon number" or "Cn," where "n" is an integer, describes a hydrocarbon or hydrocarbon-containing molecule or fragment (e.g., an alkyl or alkenyl group) wherein "n" denotes the number of carbon atoms in the fragment or molecule—irrespective of linearity or branching. Carbon number ranges as disclosed herein (e.g., $C_8$ to $C_{12}$) refer to molecules having carbon numbers within the indicated range (e.g., between 8 carbon and 12 carbon atoms), including the end members of the range. However, it is not required that every carbon number within a range be represented within the molecules being described. Likewise, an open ended carbon number range (e.g., $C_{35}+$) refers to molecules having a carbon number within the indicated range (e.g., 35 or more carbon atoms), including the end member of the range. As described herein, carbon number distributions are determined by true boiling point distribution and gas liquid chromatography. As used within this specification the total quantity of paraffins and iso-paraffins at a carbon number are determined by the ASTM D-5442 Analysis of Petroleum Waxes by Gas Chromatography ("GC") or an equivalent gas chromatography method.

In embodiments, the present invention provides a method for selecting biologically derived feedstocks to produce a low pour point renewable fuel composition from a fuel manufacturing process.

Biologically Derived Feedstock

In embodiments, the process comprises supplying normal paraffins to a renewable fuel blend, the normal paraffins being derived from a biologically derived feedstock. Biologically derived oils and fats are included in this class of feedstock. Any feedstocks comprising glycerides and free fatty acids may be included in the biologically derived feedstock. Most of the glycerides will be triglycerides, but monoglycerides and diglycerides may also be present. In embodiments, "biologically-derived oil," as defined herein, refers to any glyceride-containing oil that is at least partially derived from a biological source such as, but not limited to, crops, vegetables, microalgae, and the like. Such oils may further comprise free fatty acids.

In embodiments, the biologically-derived feedstock is obtained from biological hydrocarbonaceous oxygenated oils (i.e. "biologically-derived oil," as defined above) such as animal, vegetable and seed fats and oils, glycerides, lipids, fatty acids, and esters of fatty acids. Some non-limiting examples of vegetable and seed oils include canola oil, castor oil, corn oil, cottonseed oil, linseed oil, olive oil, palm oil, peanut oil, rapeseed oil, safflower oil, sesame oil, soybean oil, sunflower oil, tung oil, and combinations thereof. Other sources of glycerides include, but are not limited to, algae, animal tallow, and zooplankton.

The biologically derived normal paraffins may also be derived from a hydrocarbon synthesis process, using, for example, a Fischer Tropsch type of reaction. In this embodiment, a biologically sourced raw material is partially oxidized to syngas (comprising $H_2$ and CO), which is converted in a catalytic process to a mixture of oxygenated and paraffinic products. Typically, any oxidizable source of organic carbon can potentially be converted into useful products by this method. In the present process, a biologically derived feedstock is a suitable feedstock for the hydrocarbon synthesis process. Particularly useful as a feedstock is cellulosic biomass, i.e. vegetation which contains cellulose, and which is convertible to normal paraffins or other components of transportation fuels. Hydrocarbon synthesis via syngas conversion, microbial digestion, microbial fermentation and chemical decomposition are examples of processes for converting cellulose in the cellulosic biomass.

The glycerides and free fatty acids of typical vegetable and animal fat contain aliphatic hydrocarbon chains in their structure which have about 8 to about 24 carbon atoms, with a majority of the fats and oils containing high concentrations of fatty acids in the $C_{14}$ to $C_{18}$ range.

The biologically-derived feedstock provides at least one or more of $C_{14}$, $C_{16}$, and $C_{18}$ normal paraffins, which are included in the renewable fuel blend. In embodiments, the biologically-derived feedstock provides $C_{14}$, $C_{16}$, and $C_{18}$ normal paraffins such that the pour point of the renewable fuel blend is not increased as the result of the normal paraffin addition. In embodiments, the biologically derived feedstock provides one or more of $C_{14}$, $C_{16}$, and $C_{18}$ normal paraffins to produce a low pour point renewable fuel blend without the need of a pour point reducing treatment Important sources of biologically-derived oil, including many of the vegetable and seed oils, contain a significant quantity of $C_{18}$ normal paraffins, which tend to contribute to an increase in pour point. In the invention, use of one or more of these materials as the biologically-derived feedstock is balanced by the addition of sources of $C_{13}$ to $C_{17}$ normal paraffins, including $C_{14}$ and/or $C_{16}$ normal paraffins, which contribute to a decrease in pour point. While it is apparent that at least a portion of the $C_{14}$ and/or $C_{16}$ normal paraffins may be obtained from non-biological sources, the process provides for supplying at least a portion of the $C_{13}$ to $C_{18}$ normal paraffins from biological sources. In embodiments, at least a portion of the $C_{14}$ and/or $C_{16}$ normal paraffins are provided from algal sources, including from algae that have been tailored to produce significant quantities of $C_{14}$ and/or $C_{16}$ fatty acids that can be converted to normal paraffins. In embodiments, at least a portion of the $C_{14}$ and/or $C_{16}$ normal paraffins are produced in a syngas conversion process, such as a Fischer Tropsch process, for converting syngas that is produced, at least in part from partial oxidation of a renewable biological resource, including vegetation and other cellulosic material.

Examples of the biologically-derived feedstock include one or more biologically derived oils or cellulosic biomass, and the products from a preliminary conversion of biologically derived oils or cellulosic biomass, such as fatty acids, esters, alcohols and aldehydes, olefins. During preparation of normal paraffins, the biologically-derived feedstock may be treated in one or more conversion processes, including, for example, pyrolysis, deoxygenation, decarboxylation, decarbonylation, hydroxylation, saponification, hydrolysis, esterification, transesterification, interesterification, hydrogenation, hydrotreating or hydrocracking. In embodiments, normal paraffins produced by the conversion process are blended with middle distillate to produce the renewable fuel blend. In other embodiments, a blend of biologically derived feedstock with middle distillate is hydrotreated to produce the normal paraffins. Specific reaction products depend, at least in part, on at least one of the biologically derived feedstock, the conversion process, the catalyst used and the process conditions under which the conversion is conducted.

Renewable Fuel Blend

The renewable fuel blend that is the subject of the present invention comprises biologically derived hydrocarbons (i.e. organic molecules comprising carbon and hydrogen and optionally oxygen), at least some of which are normal paraffins. In embodiments, the renewable fuel blend comprises biologically derived hydrocarbons and petroleum derived hydrocarbons. In some such embodiments, the renewable fuel blend comprises up to 25 vol. % biologically derived hydrocarbons. In some such embodiments, the renewable fuel blend comprises from 80 to 99 vol. % petroleum derived hydrocarbons and from 1 to 20 vol. % biologically derived hydrocarbons.

The renewable fuel blend is characterized by a low pour point and/or a low cloud point without a pour point reducing treatment. In embodiments, the renewable fuel blend has a pour point of less than 0° C., and usually in the range of from 0° C. to −65° C. Likewise, the renewable fuel blend has a cloud point of less than 0° C., and usually in the range of from 0° C. to −65° C. In embodiments, a renewable fuel blend meets the pour point specifications of ASTM D975 without the need for a pour point reducing treatment following the hydrotreating treatment.

The renewable fuel blend comprises in the range of from 1 vol. % to 20 vol. % biologically derived $C_{13}$ to $C_{18}$ normal paraffins, such that the ratio $\Delta C_{18}/(\Delta C_{14}+\Delta C_{16})$ is less than 0.5, wherein:

$\Delta C_{18}$ represents a quantity of biologically derived $C_{18}$ normal paraffins, as a vol. % of the renewable fuel blend;

$\Delta C_{16}$ represents a quantity of biologically derived $C_{16}$ normal paraffins, as a vol. % of the renewable fuel blend; and $\Delta C_{14}$ represents a quantity of biologically derived $C_{14}$ normal paraffins, as a vol. % of the renewable fuel blend.

In embodiments, $\Delta C_{14}$ is in the range of from 0 to 10 vol. %, $\Delta C_{16}$ is in the range of from 0 to 10 vol. %, and $\Delta C_{18}$ is in the range of from 0 to 5 vol. %. In embodiments, the ratio $\Delta C_{18}/(\Delta C_{14}+\Delta C_{16})$ is in the range of between 0.01 and 0.4. In embodiments, the renewable fuel blend comprises in the range of from 3 vol. % to 15 vol. %, or in the range of from 4 vol. % to 11 vol. % biologically derived normal paraffins. In embodiments, the renewable fuel blend comprises at least 5 vol. % $C_{13}$ to $C_{17}$ biologically derived normal paraffins. In some such embodiments, the renewable fuel blend comprises at least 5 vol. % $C_{13}$ to $C_{15}$ biologically derived normal paraffins. In embodiments, the renewable fuel blend comprises less than 3 vol. %, or less than 2 vol. % biologically derived C18 normal paraffins. In embodiments, the renewable fuel blend comprises less than 3 vol. %, or less than 2 vol. % $C_{12}$ biologically derived normal paraffins.

In embodiments, the following relationship provides the expected effect on the pour point of the renewable fuel blend by addition of the biologically derived normal paraffins:

$$\Delta \text{Pour Point} = 47.41^*\Delta C_{18} - 20.04^*\Delta C_{16} - 18.91^*\Delta C_{14} \quad \text{(Eq. 1)}$$

where:

Δ Pour Point represents the change in pour point with the addition of the biologically derived $C_{13}$ to $C_{18}$ normal paraffins to the renewable fuel blend, and $\Delta C_{18}$, $\Delta C_{16}$, and $\Delta C_{18}$ are as defined above.

Eq. 1 relates to a prediction of the pour point of a renewable fuel blend. Negative values of Eq. 1 indicate the quantities of $C_{14}$ and/or $C_{16}$ and/or $C_{18}$ normal paraffins which, when added to a fuel blend, cause a decrease in the pour point of the blend. A quantity of the normal paraffins that results in Eq. 1 being equal to zero has no effect on pour point. The quantity of the normal paraffins that gives a positive value for Eq. 1 has the effect of increasing the pour point of the blend.

In embodiments, the presence of the biologically derived normal paraffins in the renewable fuel blend provides a pour point that is higher, such as in the region of 1°-5° C. higher, than the pour point of the fuel blend in the absence of the biologically derived normal paraffins. In embodiments, the presence of the biologically derived normal paraffins in the renewable fuel blend provides a pour point that is less than or equal to the pour point of the fuel blend in the absence of the biologically derived normal paraffins. In this case, the relationship of Eq. 2 holds:

$$47.41^*\Delta C_{18} - 20.04^*\Delta C_{16} - 18.91^*\Delta C_{14} \leq 0 \quad \text{(Eq. 2)}$$

A renewable fuel blend prepared according to Eq. 2 meets the pour point specifications of ASTM D975 without the need for a pour point reducing treatment following the hydrotreating treatment. In an embodiment of the process, a middle distillate is blended with $C_{14}$, $C_{16}$ and/or biologically derived $C_{18}$ normal paraffins according to Eq. 2 to produce a renewable fuel blend having a pour point that is less than or equal to that of the middle distillate without the need for a pour point reducing treatment. In embodiments, the renewable fuel blend, prepared in the absence of a pour point reducing treatment, has a pour point of no more than 0° C., or has a pour point in the range of from 0° to −65° C. In embodiments, the renewable fuel blend has a cloud point in the range of from 0° C. to −65° C.

The renewable fuel blend is a transportation fuel, which refers to hydrocarbon-based fuels suitable for consumption by vehicles. Such fuels include, but are not limited to, diesel, gasoline, jet fuel and the like. In embodiments, the renewable fuel blend is a diesel fuel, which generally includes any fuel that can be used in a compression ignition engine or the like, and which typically has a boiling point range of between 200° C. (about 392° F.) and 350° C. (about 662° F.). In some such embodiments, the renewable fuel blend meets the ASTM International Standard Specification for Diesel Fuel Oils D975 (Rev. December 2008), which sets forth specifications for seven diesel fuel oil grades, including Grades 1-D (referred to herein interchangeably as Grade 1 diesel fuel oil or No. 1 diesel fuel), 2-D (e.g., Grade 2 or No. 2 diesel fuel oil), and 4-D (e.g., Grade 4 or No. 4 diesel fuel oil). Each ASTM specification or other reference citation described herein is expressly incorporated by reference in its entirety.

Pour point is one useful measure of the quality of a renewable fuel blend. "Pour point," as defined herein, represents the lowest temperature at which a fluid will pour or flow. See, e.g., ASTM International Standard Test Methods D 5950-02 (2007).

Cloud point is a useful measure of the quality of a renewable fuel blend. "Cloud Point" as described herein, is the temperature of a liquid specimen when the smallest observable cluster of hydrocarbon crystals first occurs upon cooling under prescribed conditions. See, e.g., ASTM International Standard Test Methods D 2500-09.

In general, the middle distillate that is a component of the renewable fuel blend is either petroleum based, derived from biological sources (e.g. a biologically derived feedstock), or a combination of the two. In embodiments, the middle distillate is petroleum based. In embodiments, the middle distillate is recovered as a distillate fraction from a vacuum distillation in refinery operations. In some such embodiments, the middle distillate has the chemical and physical properties consistent with at least one diesel fuel specification. Middle distillate fractions as described herein boil in the range of about 250°-700° F. (121°-371° C.) as determine by ASTM D86-10a, "Standard Test Method for Distillation of Petroleum Products at Atmospheric Pressure". In embodiments, during the preparation of the renewable fuel blend, the middle distillate meets the flash point specification, the boiling range specification, the sulfur specification, and the cloud point specification of a diesel fuel meeting the specification requirements of ASTM D975-10c. In other embodiments, the middle distillate is hydrotreated, with at least a portion of the liquid product recovered from hydrotreating process being used to prepare the renewable fuel blend. In embodiments, the biologically derived normal paraffins are blended with the middle distillate prior to hydrotreating. In embodiments, the biologically derived normal paraffins are blended with the liquid product recovered from the hydrotreating process. In embodiments, the biologically derived feedstock is blended with the middle distillate prior to hydrotreating.

Producing a Renewable Fuel Blend

The process for producing the renewable fuel blend comprises providing in the range of from 1 vol. % to 20 vol., % biologically derived $C_{13}$ to $C_{18}$ normal paraffins to the renewable fuel blend, such that the ratio $\Delta C_{18}/(\Delta C_{14}+\Delta C_{16})$ is less than 0.5,
wherein:
$\Delta C_{18}$, $\Delta C_{16}$, and $\Delta C_{18}$ are as defined above.

In embodiments, $\Delta C_{14}$ is in the range of from 0 to 10 vol. %, $\Delta C_{16}$ is in the range of from 0 to 10 vol. %, and $\Delta C_{18}$ is in the range of from 0 to 5 vol. %. In embodiments, the ratio $\Delta C_{18}/(\Delta C_{14}+\Delta C_{16})$ is in the range of between 0.01 and 0.4. In embodiments, the process comprises providing in the range of from 3 vol. % to 15 vol. %, or from 4 vol. % to 11 vol. % biologically derived normal paraffins to the renewable fuel blend. In embodiments, the process comprises providing at least 5 vol. % $C_{13}$ to $C_{17}$ biologically derived normal paraffins to the renewable fuel blend. In embodiments, the process comprises providing at least 5 vol. % $C_{13}$ to $C_{15}$ biologically derived normal paraffins to the renewable fuel blend. In embodiments, the process comprises providing no more than 3 vol. %, or no more than 2 vol. %, biologically derived $C_{18}$ normal paraffins to the renewable fuel blend. In embodiments, the process comprises providing no more than 3 vol. %, or no more than 2 vol. %, biologically derived C12 normal paraffins to the renewable fuel blend.

In embodiments, the process comprises providing $C_{14}$ and/or $C_{16}$ and biologically derived $C_{18}$ normal paraffins to the renewable fuel blend such that the relationship of Eq. 2 holds:

$$47.41*\Delta C18 - 20.04*\Delta C16 - 18.9*\Delta C14 \leq 0 \qquad \text{(Eq. 2)}$$

The renewable fuel blend prepared by the process has a pour point of no more than 0° C., in the absence of a pour point reducing treatment. In embodiments, the renewable fuel blend prepared in the process has a pour point in the range of from 0° to −65° C. In embodiments, the renewable fuel blend prepared in the process has a cloud point in the range of from 0° C. to −65° C.

In embodiments, the process comprises blending the biologically derived normal paraffins with middle distillate to produce the renewable fuel blend, wherein the normal paraffins are produced by converting biologically derived oils or cellulosic biomass to the normal paraffins in one or more conversion processes, such as, for example, by hydrotreating. In embodiments, the normal paraffins are recovered from a process for hydroprocessing a biologically derived feedstock comprising fatty acids. In embodiments, liquid products recovered from the effluent from the hydrotreating process includes the $C_{13}$ to $C_{18}$ normal paraffins, which may be separated from the remaining liquid products and blended with middle distillate, to produce a renewable fuel blend having a pour point that is equal to or less than the pour point of the middle distillate, without being subjected to a pour point reducing treatment. In embodiments, the pour point of the fuel blend comprising the biologically derived normal paraffins and the middle distillate is at least 1° C., or at least 2° C., or at least 3° C. lower than the pour point of the middle distillate. As before, the renewable fuel blend prepared in this way, and containing the biologically derived normal paraffins, has a resulting pour point such that the relationship of Eq. 2 holds.

In embodiments, a biologically derived feedstock is blended with middle distillate, and the blend is hydrotreated to form a renewable fuel blend comprising $C_{13}$ to $C_{18}$ normal paraffins from the biologically derived feedstock. In embodiments, the renewable fuel blend so prepared has a pour point that is equal to or less than the pour point of the middle distillate, without being subjected to a pour point reducing treating. In embodiments, the renewable fuel blend has a pour point that is equal to or less than the pour point of a similarly prepared fuel blend, but in the absence of an added biologically derived feedstock in the feed to the hydrotreating process. As before, the renewable fuel blend prepared in this way, and containing the biologically derived normal paraffins, has a resulting pour point such that the relationship of Eq. 2 holds.

In embodiments, the biologically derived feedstock is prepared an a preliminary conversion process. In some such embodiments, the feed to the preliminary conversion process comprises one or more of at least one biologically derived oil or cellulosic biomass. The preliminary conversion process may involve one or more of pyrolysis, deoxygenation, decarboxylation, decarbonylation, hydroxylation, saponification, hydrolysis, esterification, transesterification, interesterification, syngas conversion and hydrocarbon synthesis, hydrogenation, hydrotreating or hydrocracking, prior to hydrotreating to convert the intermediate products to liquid products comprising biologically derived $C_{13}$ to $C_{18}$ normal paraffins.

A pour point reducing treatment process can be one or more processes useful for reducing the pour point of middle distillate, diesel fuel, renewable fuel blend, biologically derived hydrocarbon, and the like. Isomerization or hydroisomerization, including catalytic isomerization or hydroisomerization, catalytic or solvent dewaxing, filtering, clay treating and adsorption and addition of pour point reducing additives are non-limiting examples of a pour point reducing process. Thus, the process for preparing the renewable fuel blend produces a low pour point product, including a pour point of no more than 0° C., without the use of a pour point reducing process. Additional pour point reducing treatments, e.g. addition of pour point reducing additives, may be applied to the low pour point blend, if desired, to further reduce the pour point.

Typical hydroisomerization conditions include a temperature between 200° F. and 700° F., with a LHSV between 0.1 and 10. Hydrogen is employed such that the mole ratio of hydrogen to hydrocarbon is between 1:1 and 15:1. Catalysts useful for isomerization processes are generally bifunctional catalysts that include a dehydrogenation/hydrogenation component and an acidic component. The acidic component may include one or more of amorphous mixed oxides such as silica-alumina; a zeolitic material such as zeolite Y, ultrastable Y, SSZ-32, Beta zeolite, mordenite, ZSM-5 and the like, or a non-zeolitic molecular sieve such as SAPO-11, SAPO-31 and SAPO-41. The acidic component may further include a halogen component, such as fluorine. The hydrogenation component may be selected from the Group VIII noble metals such as platinum and/or palladium, from the Group VIII non-noble metals such as nickel and tungsten, and from the Group VI metals such as cobalt and molybdenum. If present, the platinum group metals will generally make up from about 0.1% to about 2% by weight of the catalyst. If present in the catalyst, the non-noble metal hydrogenation components generally make up from about 5% to about 40% by weight of the catalyst. As used herein, the terms "isomerization" and "hydroisomerization" are used interchangeably.

During solvent dewaxing, waxy molecules present in a petroleum or biologically derived fluid are removed by chilling the fluid to permit the waxy molecules to agglomerate into a suspended solid with solid particles large enough to be removed by filtering. The fluid is generally mixed with a solvent, such as a 1:1 mixture of toluene and methylethylketone prior to chilling to facilitate the process of separating the wax from the liquid portion of the fluid.

The hydrotreating process refers to processes or treatments that react a hydrocarbon-based material with hydrogen, typically under pressure and with a catalyst. Hydrotreating conditions include a reaction temperature between 400° F.-900° F. (204° C.-482° C.); a pressure between 500 to 5000 psig (pounds per square inch gauge) (3.5-34.6 MPa); a feed rate (LHSV) of 0.5 hr-1 to 20 hr-1 (v/v); and overall hydrogen consumption 300 to 2000 scf per barrel of liquid hydrocarbon feed (53.4-356 m3 H2/m3 feed). The hydrotreating catalyst will typically be a composite of a Group VI metal or compound thereof, and a Group VIII metal or compound thereof supported on a porous refractory base such as alumina Examples of hydrotreating catalysts are alumina supported cobalt-molybdenum, nickel, nickel-tungsten, cobalt-tungsten and nickel-molybdenum. Typically such hydrotreating catalysts are presulfided.

The hydrotreating is conducted at reaction conditions and in the presence of a catalyst to remove heteroatoms (including one or more of sulfur, nitrogen and oxygen) from the feed to the hydrotreating. Hydrotreating is generally conducted at conditions to ensure that no more than 15 wt. % of the feed to the hydrotreater is converted to lower molecular weight products via carbon-carbon bond breaking, and to ensure that no more than 15 wt. % of the normal paraffins in the feed to the hydrotreater, or generated during hydrotreating, are converted to branched paraffinic products via isomerization reactions.

In embodiments, the hydrotreating process for preparing the renewable fuel blend from the blend of the biologically derived feedstock with middle distillate further includes reaction conditions such that at least 90 wt. % of the oxygen contained in the blend is converted to $H_2O$, CO or $CO_2$. In embodiments, the hydrotreating step is conducted at reaction conditions such that less than 10 wt. % of the biologically derived normal paraffins that are produced during hydrotreating are decarboxylated during hydrotreating. In embodiments, the pour point of the renewable fuel blend is lower than the pour point of the middle distillate. In some such embodiments, the pour point of the renewable fuel blend is at least 1° C., or 2° C., or 3° C. lower than the pour point of the middle distillate from which it is prepared.

Determination of Biologically Sources Paraffins

The carbon content of biologically-derived resources and biologically-derived products from a "new carbon" source may be determined by ASTM D6866-10. This test method measures the $^{14}C/^{12}C$ isotope ratio in a sample and compares it to the $^{14}C/^{12}C$ isotope ratio in a standard 100% biobased material to give percent biobased content of the sample. "Biobased materials" are organic materials in which the carbon comes from recently (on a human time scale) fixated $CO_2$ present in the atmosphere using sunlight energy (photosynthesis). On land, this $CO_2$ is captured or fixated by plant life (e.g., agricultural crops or forestry materials). In the oceans, the $CO_2$ is captured or fixated by photosynthesizing bacteria or phytoplankton. For example, a biobased material has a $^{14}C/^{12}C$ isotope ratio greater than 0. In contrast, a fossil-based material has a $^{14}C/^{12}C$ isotope ratio of about 0.

The application of ASTM-D6866 to derive "biobased content" is built on the same concepts as radiocarbon dating, but without use of the age equations. The analysis is performed by deriving a ratio of the quantity of radiocarbon ($^{14}C$) in an unknown sample to that of a modern reference standard. The ratio is reported as a percentage (percent modern carbon). If the material being analyzed is a mixture of present day radiocarbon and fossil carbon (containing no radiocarbon), then the percent modern carbon value obtained correlates directly to the quantity of biologically-derived material present in the sample.

The modern reference standard used in radiocarbon dating is a National Institute of Standards and Technology standard with a known radiocarbon content equivalent approximately to the year AD 1950. AD 1950 was chosen since it represented a time prior to thermonuclear weapons testing which introduced large quantities of excess radiocarbon into the atmosphere with each explosion (termed "bomb carbon"). The AD 1950 reference represents 100 percent modern carbon. Bomb carbon in the atmosphere reached almost twice normal levels in 1963 at the peak of testing and prior to the treaty halting the testing. Its distribution within the atmosphere has been approximated since its appearance, showing values that are greater than 100 percent modern carbon for plants and animals living since AD 1950. It has gradually decreased over time with today's value being near 105.3 percent modern carbon (as of the year 2010). This means that a fresh biomass material such as corn could give a radiocarbon signature near 105.3 percent modern carbon.

Combining fossil carbon with present day carbon into a material will result in a dilution of the present day percent modern carbon content. By presuming 105.3 percent modern carbon represents present day biologically-derived materials and 0 percent modern carbon represents petroleum-derived materials, the measured percent modern carbon value for that material will reflect the proportions of the two component types. A material derived 100% from present day soybeans would give a radiocarbon signature near 105.3 percent modern carbon. If that material was diluted with 50% petroleum derivatives, it would give a radiocarbon signature near 53 percent modern carbon.

A biomass content result is derived by assigning 100% equal to 105.3 percent modern carbon and 0% equal to 0 percent modern carbon. In this regard, a sample measuring 99 percent modern carbon will give an equivalent biobased content result of 94%.

In the example illustrated in FIG. 1, renewable fuel blend 10 is prepared as follows: 5 mass units of palm oil 15 are blended with 90 mass units of middle distillate 20. The middle distillate has a pour point of −7° C. During hydrotreating, the palm oil supplies to the renewable fuel blend 2.8 mass units of $C_{18}$ normal paraffins and 2.1 mass units of $C_{16}$ normal paraffins. To produce a renewable fuel blend with a pour point equal to or less than −7° C., 5 mass units of $C_{14}$ normal paraffin equivalent are added to the palm oil/middle distillate blend prior to hydrotreating. This quantity of $C_{14}$ normal paraffins is determined from the relationship of Eq. 2, in order to produce a renewable fuel blend without requiring a pour point reducing treatment to achieve a −7° C. pour point. In the embodiment illustrated in FIG. 1, a biologically derived oil, such as algal oil 25 which has been specifically tailored to produce a significant quantity of $C_{14}$ fatty acids, and little or no $C_{18}$ fatty acids, is treated in a preliminary conversion step 30 to produce a biologically derived feedstock 35 comprising free fatty acids for supplying the 5 mass units of $C_{14}$ normal paraffin equivalent (i.e. the quantity of algae is added to provide 5 mass units of $C_{14}$ normal paraffins in the renewable fuel blend). The biologically derived feedstock 35 is combined with the palm oil 15 and the middle distillate 20, and the blend 40 is hydrotreated in hydrotreating step 45. The renewable fuel blend 10 recovered from the hydrotreated liquid effluent 50 is found to have a pour point of −7° C. or lower.

Example 1

A middle distillate having the properties shown in Table 1 was prepared.

TABLE 1

| | |
|---|---|
| Cloud point | −6° C. |
| Pour point | −8° C. |
| D86 distillation | |
| Initial boiling point | 375° F. |
| 50% by volume, boiling point | 539° F. |
| Final boiling point | 670° F. |
| Flash point | 176° F. |
| Density | 0.8451 g/cm³ |
| Sulfur | 13 ppm |
| Viscosity, @ 40° C. | 3.2 cp |

Example 2

The middle distillate of Example 1 was blended with various mixtures of normal paraffins to form fuel blends containing from 90 to 100 vol. % middle distillate, with varying quantities of normal paraffins. The measured pour point of each blend is listed in in Table 2, and compared with that of an estimated pour point, based on the equation:

$$\text{Estimated pour point} = 47.41 \cdot \Delta C_{18} - 20.04 \cdot \Delta C_{16} - 18.91 \cdot \Delta C_{14} - 8 \quad \text{(Eq. 3)}$$

where:
  $\Delta C_{18}$ represents a quantity of $C_{18}$ normal paraffins provided by the biologically derived feedstock, as a vol. % of the renewable fuel blend;
  $\Delta C_{16}$ represents a quantity of $C_{16}$ normal paraffins provided by the biologically derived feedstock, as a vol. % of the renewable fuel blend; and
  $\Delta C_{14}$ represents a quantity of $C_{14}$ normal paraffins provided by the biologically derived feedstock, as a vol. % of the renewable fuel blend.

In this equation, the intercept value, −8, represents the base case pour point in ° C.

Figure 2:
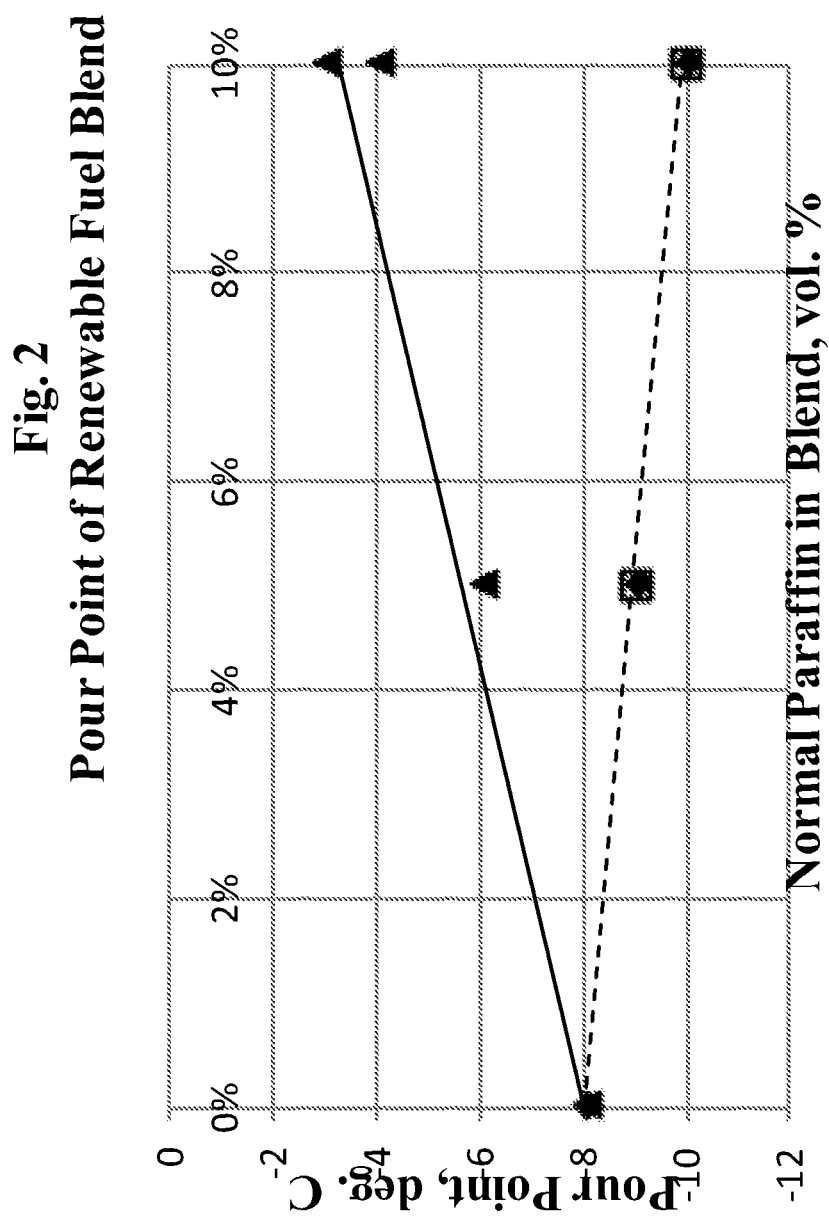

FIG. 2 illustrates a set of blending relationships from the results in Table 2. Each set of data points is a graphical representation of the change in pour point when a normal paraffin is blended in varying quantities into middle distillate. One curve illustrates the blend of $C_{14}$ normal paraffin, one curve the blend of $C_{16}$ normal paraffin, and one curve the blend of $C_{18}$ with middle distillate. Also included in FIG. 2 are lines which represent the estimated pour point based on the relationship of Eq. 3. It will be noted that the estimated pour points in each case closely match experimental values. It will also be noted that $C_{14}$ and $C_{16}$ normal paraffins have almost equal pour point reducing properties when blended with this particular middle distillate, while $C_{18}$ normal paraffins have a detrimental effect on pour point at all concentrations.

FIG. 3 illustrates another set of blending relationships from the results in Table 2. In each case, 10 vol. % normal paraffins were blended with the middle distillate of Example 1. In one case, a blend of $C_{14}$ and $C_{18}$ normal paraffins with the middle distillate of Example 1 was analyzed, for a range of ratios between 10% $C_{14}$ normal paraffin with no $C_{18}$ normal paraffin, to 10% $C_{18}$ normal paraffin with no $C_{14}$ normal paraffin. A similar series of test samples containing varying quantities of $C_{16}$ and $C_{18}$ normal paraffins was also screened for changes in pour point.

The data illustrated in FIG. 3 is for a blend of 10 vol. % normal paraffins in the middle distillate of Example 1. In one case, the renewable fuel blend included $C_{14}$ and $C_{18}$ normal paraffins, in varying quantities from 10% $C_{14}$ to 10% $C_{18}$. In the other case, the renewable fuel blend included $C_{16}$ and $C_{18}$ normal paraffins, in varying quantities from 10% $C_{16}$ to 10% $C_{18}$ normal paraffins. The lines connecting the experimental data represent the estimated pour point based on the predictive formula in Eq. 3.

FIG. 3 again illustrates the close relationship between predicted and measured pour points in the blends. FIG. 3 also shows that the ratio $C_{14}$ (or $C_{16}$):$C_{18}$ of greater than 7:3 (i.e. less than 30% $C_{18}$) results in a renewable fuel blend with reduced pour point, with no pour point reducing treatment.

TABLE 2

Change Of Pour Point For Blends Of Middle Distillate With N-Paraffins

| | | | | Pour Point, ° C. | | |
|---|---|---|---|---|---|---|
| Middle Distillate | $C_{14}$ normal paraffins, vol % | $C_{16}$ normal paraffin, vol % | $C_{18}$ normal paraffins, vol % | Measured | Estimate from Eq. 3 | Cloud Point, ° C. |
| Base case | | | | | | |
| 100.0% | 0.0% | 0.0% | 0.0% | −8 | −8 | −6 |
| Blends | | | | | | |
| 92.5% | 2.5% | 2.5% | 2.5% | −8 | −8 | −6 |
| 93.4% | 3.3% | 3.3% | 0.0% | −9 | −9 | −6 |
| 93.4% | 3.3% | 0.0% | 3.3% | −7 | −7 | −6 |

TABLE 2-continued

Change Of Pour Point For Blends Of Middle Distillate With N-Paraffins

| Middle Distillate | $C_{14}$ normal paraffins, vol % | $C_{16}$ normal paraffin, vol % | $C_{18}$ normal paraffins, vol % | Pour Point, °C. Measured | Pour Point, °C. Estimate from Eq. 3 | Cloud Point, °C. |
|---|---|---|---|---|---|---|
| 95.0% | 0.0% | 5.0% | 0.0% | −9 | −9 | −7 |
| 90.0% | 0.0% | 10.0% | 0.0% | −10 | −10 | −8 |
| 95.0% | 0.0% | 0.0% | 5.0% | −6 | −6 | −4 |
| 90.0% | 5.0% | 5.0% | 0.0% | −10 | −10 | −8 |
| 90.0% | 0.0% | 5.0% | 5.0% | −6 | −7 | −5 |
| 95.0% | 5.0% | 0.0% | 0.0% | −9 | −9 | −5 |
| 90.0% | 0.0% | 0.0% | 10.0% | −4 | −3 | −2 |
| 93.4% | 0.0% | 3.3% | 3.3% | −7 | −7 | −4 |
| 90.0% | 10.0% | 0.0% | 0.0% | −10 | −10 | −6 |
| 90.1% | 3.3% | 3.3% | 3.3% | −7 | −8 | −6 |
| 90.0% | 5.0% | 0.0% | 5.0% | −6 | −7 | −4 |
| 100.0% | 0.0% | 0.0% | 0.0% | −8 | −8 | −6 |
| 90.0% | 0.0% | 0.0% | 10.0% | −3 | −3 | −2 |
| 90.0% | 5.0% | 5.0% | 0.0% | −11 | −10 | −7 |
| 93.4% | 3.3% | 3.3% | 0.0% | −9 | −9 | −6 |
| 90.0% | 5.0% | 0.0% | 5.0% | −7 | −7 | −5 |

Example 4

A normal paraffin blend having the composition shown in Table 3 was prepared.

TABLE 3

| Normal Paraffin | Vol. % of normal paraffin blend |
|---|---|
| n-$C_{12}$ | 0.16 |
| n-$C_{13}$ | 18.26 |
| n-$C_{14}$ | 3.70 |
| n-$C_{15}$ | 55.83 |
| n-$C_{16}$ | 0.52 |
| n-$C_{17}$ | 21.53 |

The normal paraffin blend was blended with a middle distillate, having physical properties tabulated in Table 4.

TABLE 4

| Cloud point | −10° C. |
|---|---|
| Pour point | −13° C. |
| D86 distillation | |
| Initial boiling point | 318° F. |
| 50% by volume, boiling point | 527° F. |
| Final boiling point | 653° F. |
| Flash point | 140° F. |
| Density | 0.8301 g/cm³ |
| Sulfur | 5 ppm |
| Viscosity, @ 40° C. | 2.7 cp |

Four blend products were prepared, ranging from 5 vol. % to 20 vol. % of the normal paraffin blend. The pour points and cloud points of the blend products are tabulated in Table 5.

TABLE 5

| | Quantity of normal paraffins in blend product, vol. % | | | |
|---|---|---|---|---|
| | 5% | 10% | 15% | 20% |
| Cloud Point, °C. | −11 | −11 | −11 | −11 |
| Pour Point, °C. | −16 | −17 | −15 | −12 |

These data show that $C_{13}$ to $C_{17}$ normal paraffins, when blended at concentrations up to 15 vol. % in middle distillate, improves both pour and cloud points of the blended product relative to the middle distillate from which the blend product is made.

What is claimed is:

1. A process for producing a renewable fuel blend comprising:
   hydrotreating a biologically derived feedstock selected from animal, vegetable and seed fats and oils, glycerides, lipids, fatty acids, esters of fatty acids, and combinations thereof to form a hydrotreated effluent;
   recovering biologically derived $C_{14}$, $C_{16}$ and $C_{18}$ normal paraffins from the hydrotreated effluent;
   blending a petroleum derived middle distillate with 1 vol. % to 20 vol. % of the biologically derived $C_{14}$, $C_{16}$ and $C_{18}$ normal paraffins to produce a renewable fuel blend having a pour point that is in a range from 0° C. to −65° C., the renewable fuel blend further characterized by a ratio $\Delta C_{18}/(\Delta C_{14}+\Delta C_{16})$ that is less than 0.5, the process not including a pour point reducing treatment,
   wherein:
   $\Delta C_{18}$ represents a quantity of biologically derived $C_{18}$ normal paraffins, as a vol. % of the renewable fuel blend;
   $\Delta C_{16}$ represents a quantity of biologically derived $C_{16}$ normal paraffins, as a vol. % of the renewable fuel blend; and
   $\Delta C_{14}$ represents a quantity of biologically derived $C_{14}$ normal paraffins, as a vol. % of the renewable fuel blend.

2. The process according to claim 1, comprising blending with the middle distillate in the range of from 3 vol. % to 15 vol. % biologically derived $C_{14}$, $C_{16}$ and $C_{18}$ normal paraffins.

3. The process according to claim 1, comprising blending with the middle distillate no more than 3 vol. % biologically derived $C_{18}$ normal paraffins.

4. The process according to claim 1, further comprising recovering biologically derived $C_{12}$ normal paraffins from the hydrotreated effluent, and blending with the middle distillate no more than 3 vol. % of the biologically derived $C_{12}$ normal paraffins.

5. The process according to claim 1, wherein the ratio $\Delta C_{18}/(\Delta C_{14}+\Delta C_{16})$ is in the range of between 0.01 and 0.4.

6. The process according to claim 1, wherein the biologically derived $C_{14}$, $C_{16}$ and $C_{18}$ normal paraffins are blended with the middle distillate such that the following relationship holds:

$$47.41*\Delta C_{18} - 20.04*\Delta C_{16} - 18.91*\Delta C_{14} \leq 0$$

wherein:

$\Delta C_{18}$ represents a quantity of biologically derived $C_{18}$ normal paraffins, as a vol. % of the renewable fuel blend;

$\Delta C_{16}$ represents a quantity of biologically derived $C_{16}$ normal paraffins, as a vol. % of the renewable fuel blend; and $\Delta C_{14}$ represents a quantity of biologically derived $C_{14}$ normal paraffins, as a vol. % of the renewable fuel blend.

7. The process according to claim 1, wherein the cloud point of the renewable fuel blend is in the range of from 0° C. to −65° C.

* * * * *